INVENTOR
P. R. GRAY
BY R. O. Covell
ATTORNEY.

Sept. 25, 1956 P. R. GRAY 2,764,636

DIAL TELEPHONE SYSTEM ARRANGED FOR OPERATOR OR MACHINE ANNOUNCEMENT ON INTERCEPTED CALLS

Filed Feb. 27, 1952 7 Sheets-Sheet 2

INVENTOR
P. R. GRAY

BY R. O. Covell

ATTORNEY

Sept. 25, 1956 P. R. GRAY 2,764,636

DIAL TELEPHONE SYSTEM ARRANGED FOR OPERATOR OR MACHINE ANNOUNCEMENT ON INTERCEPTED CALLS

Filed Feb. 27, 1952 7 Sheets-Sheet 3

INVENTOR
P. R. GRAY
BY
R. O. Covell
ATTORNEY

Sept. 25, 1956 P. R. GRAY 2,764,636

DIAL TELEPHONE SYSTEM ARRANGED FOR OPERATOR OR MACHINE ANNOUNCEMENT ON INTERCEPTED CALLS

Filed Feb. 27, 1952 7 Sheets-Sheet 4

INVENTOR
P. R. GRAY
BY R. O. Covell
ATTORNEY

Sept. 25, 1956 P. R. GRAY 2,764,636

DIAL TELEPHONE SYSTEM ARRANGED FOR OPERATOR OR MACHINE ANNOUNCEMENT ON INTERCEPTED CALLS

Filed Feb. 27, 1952 7 Sheets-Sheet 5

INVENTOR
BY P. R. GRAY
R. O. Covell
ATTORNEY

Sept. 25, 1956 P. R. GRAY 2,764,636

DIAL TELEPHONE SYSTEM ARRANGED FOR OPERATOR OR MACHINE ANNOUNCEMENT ON INTERCEPTED CALLS

Filed Feb. 27, 1952 7 Sheets-Sheet 6

INVENTOR
P. R. GRAY
BY
R. O. Covell
ATTORNEY

INVENTOR
P. R. GRAY
BY R. O. Covell
ATTORNEY

United States Patent Office 2,764,636

Patented Sept. 25, 1956

2,764,636

DIAL TELEPHONE SYSTEM ARRANGED FOR OPERATOR OR MACHINE ANNOUNCEMENT ON INTERCEPTED CALLS

Preston R. Gray, Elmhurst, N. Y., assignor to Bell Telephone Laboratories, Incorporated, New York, N. Y., a corporation of New York Application February 27, 1952, Serial No. 273,656

6 Claims. (Cl. 179—27)

Figures 1, 8:
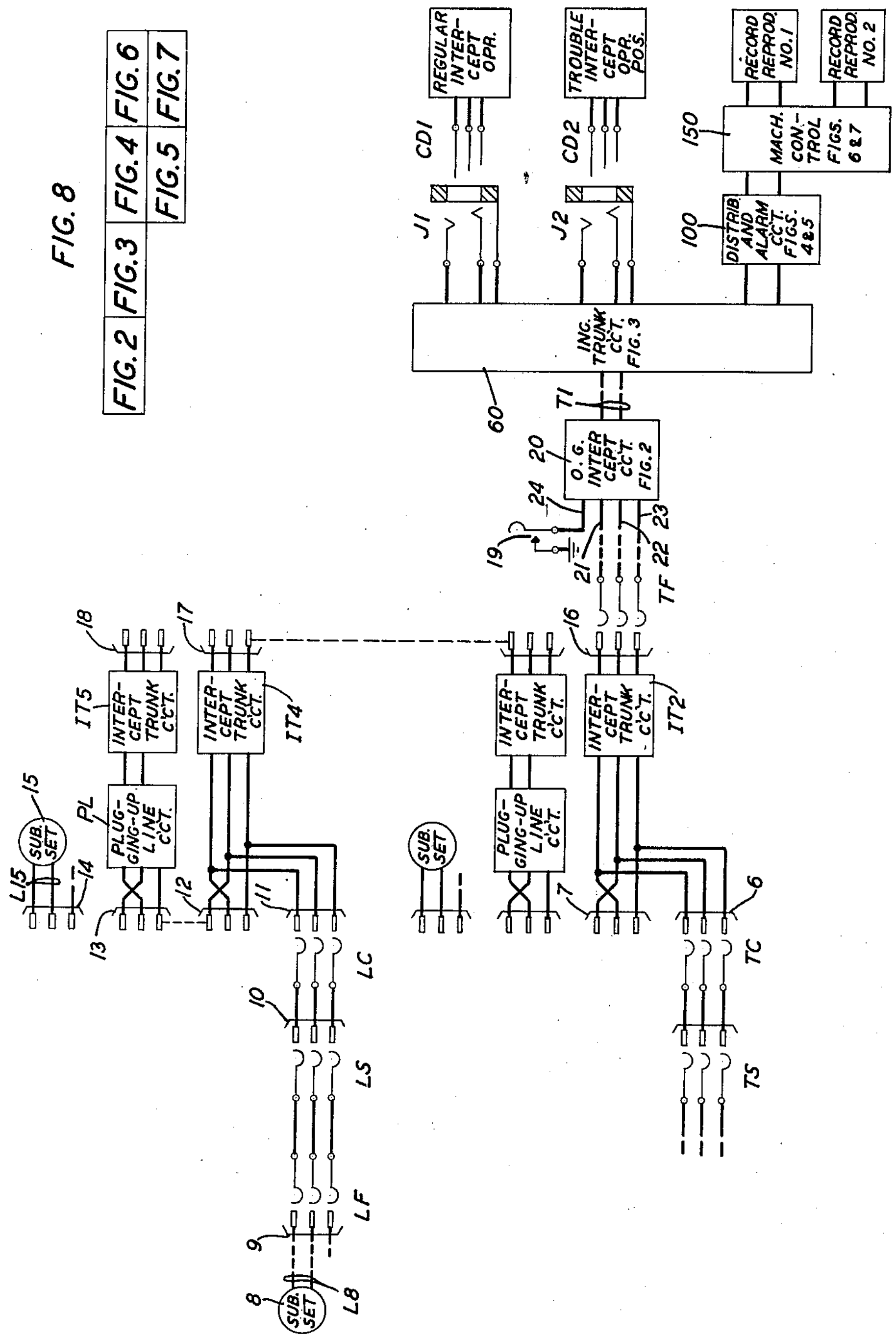

This invention relates to telephone systems and particularly to systems comprising automatic switching equipment for establishing telephone connections between calling and called subscriber stations.

Objects of the invention are improvement of the means for, and method of, intercepting calls to unassigned, vacated, and disconnected subscriber line terminals in the banks of final selector or connector switches; and the provision of means, effective on such calls arising from faulty memory or incorrect dialing, for automatically giving the calling subscriber instructions to consult the directory and initiate a new call.

This invention is an automatic telephone system comprising automatic switching means for establishing desired connections between calling and called subscriber lines in which calls extended to unassigned and vacated line terminals are automatically further extended to an announcement or message recording and reproducing device which thereupon transmits a recorded message to the calling subscriber; and in which calls to line terminals, previously assigned to a subscriber who has now been assigned a different directory number, and calls to lines temporarily plugged out of service because of a trouble condition are extended to an intercepting operator position.

A feature of the invention is a system, as above described, in which the message transmitted to the calling subscriber by the answering device is repeated a predetermined number of times unless the connection is previously released; and a further feature is the automatic transfer of a connection, extended to the announcing device, from the announcing device to an intercepting operator position if the calling subscriber fails to release the connection after the announcing device has effected the transmission of the message recorded thereon to the calling subscriber a predetermined number of times.

A clear and complete description of the invention will be facilitated by reference to the drawing which shows schematically an automatic telephone system in which the invention and its features are embodied. Referring to the drawing:

Fig. 1 shows in diagrammatic form the essential components of this system;

Figs. 2 to 7, inclusive, show the details of trunk, alarm and distributing and announcement machine control circuits; and Fig. 8 shows the relative position in which Figs. 2 to 7 are to be placed to form an operative arrangement.

Referring now to Fig. 1, 8 and 15 represent subscriber telephone stations of any suitable known type including a dial for use in completing desired connections, which are connected respectively by lines L8 and L15 to line terminals in the banks of both line finder and connector switches, these connections being illustrated by the connection of line L8 to a set of terminals 9 in the bank of a line finder switch LF and by the connection of line L15 to a set of terminals 14 in the bank of a connector switch LC. Upon initiation of a call at subscriber station A, a line finder LF establishes connection from the line L8 to a local selector LS, which is operatively controlled by the subscriber's dial to extend the connection, directly or through intermediate selector switches (not shown) to a connector switch LC having access to a set of line terminals 14 connected to a called subscriber line L15. The line finder, selector and connector switches may be of the step-by-step type; and reference may be had to pages 53 to 65, inclusive of "Automatic Telephony" by Smith and Campbell, 2nd edition, published in 1921 for a description of the structure and operation of such switches. Reference may also be had to Patent 1,799,654, granted to R. L. Stokely April 7, 1931, for a description of a line finder switch of the step-by-step type. The line finder LF and selector LS are each represented by a set of brushes and a single set of bank terminals, all other switch elements and associated apparatus and connections thereto being omitted. The connector switch LC is represented by a set of brushes and four sets of terminals, the terminals 14 being connected to subscriber line L15, the terminals 12 and 11 being both connected to an intercepting trunk circuit IT4, and the terminals 13 being connected to a plugging-up line circuit PL and therethrough to an intercepting trunk circuit IT5. The intercepting trunk circuit IT4 is similar to the trunk circuit IT4 fully disclosed in Patent 2,021,286 granted to E. D. Butz, November 19, 1935; and the plugging-up line circuit PL and trouble intercepting trunk circuit IT5 are similar respectively to the line and trunk circuits PL and IT5 fully disclosed in said Butz patent. Fig. 1 further shows a toll selector TS, and a toll connector TC and intercepting trunk circuit IT2, each of which is similar to like designated elements in the Butz patent. The incoming conductors of each intercepting trunk circuit such as IT2, IT4 and IT5, are connected to a plurality of sets of terminals in the banks of connector switches, the number of such circuits provided being dependent on the volume of calls to be intercepted. It is to be particularly noted that each of the intercepting trunk circuits IT2 and IT4 is connected to two sets of terminals; the terminals 6 and 11 represent terminals previously connected to subscribers' lines whose numbers have been changed and calls to which should be extended to an operator position, such calls being referred to herein as regular or operator intercept; and the terminals 7 and 12 represent unassigned terminals, calls to which may be extended to an announcement device or machine instead of to an operator, such calls being referred to herein as machine intercept. The tip and ring conductors incoming to trunk circuit IT4 are interchanged with respect to the two sets of terminals 11 and 12 thereby enabling identification of a call as requiring operator intercept or machine intercept as hereinafter further explained. The tip and ring conductors incoming to trunk circuit IT2 are interchanged with respect to the two sets of terminals 6 and 7 for a like reason.

Each of the intercepting trunk circuits such as IT2, IT4 and IT5 are individually connected to sets of terminals 16, 17 and 18 in the banks of trunk finder switches TF which are provided to concentrate the intercept traffic and route such calls over a smaller group of trunks, represented by trunk T1, extending to a centralized intercepting equipment comprising operator positions and announcing machines common to a plurality of such groups of trunks. The trunk finder TF which may be of the step-by-step type is represented in the drawing by a set of brushes and the three sets of terminals, all associated switch and circuit elements being omitted. Each trunk finder TF, one for each trunk extending to the centralized intercept equipment, may be similar to the trunk finder TF fully disclosed in the aforementioned Butz patent. The trouble intercepting trunk circuits IT5 are connected to a particular one or more levels of the trunk finders. A set of normal post springs 19 is provided and operated whenever the trunk finder brushes connect with a set of terminals in a level in which trouble intercepting trunks are connected, thereby to particularly identify trouble intercept calls and effect the extension of such calls to an operator position instead of to the announcement machine, as hereinafter further explained. Reference may be had to Patent 1,888,700 granted November 22, 1932 to H. Sengebusch for a complete disclosure of the structure and operation of normal post springs associated with a step-by-step switch.

Figure 2:
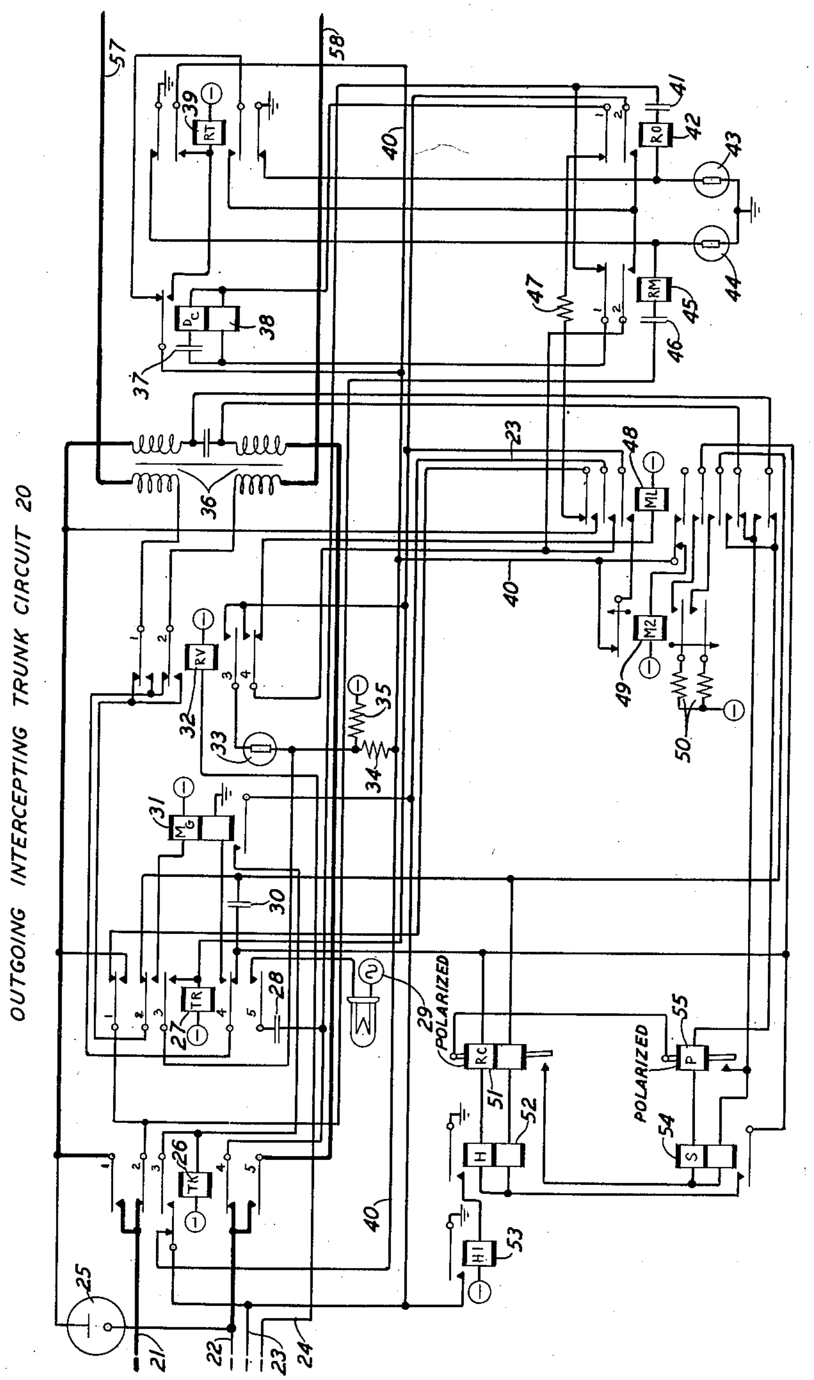
Figure 3:
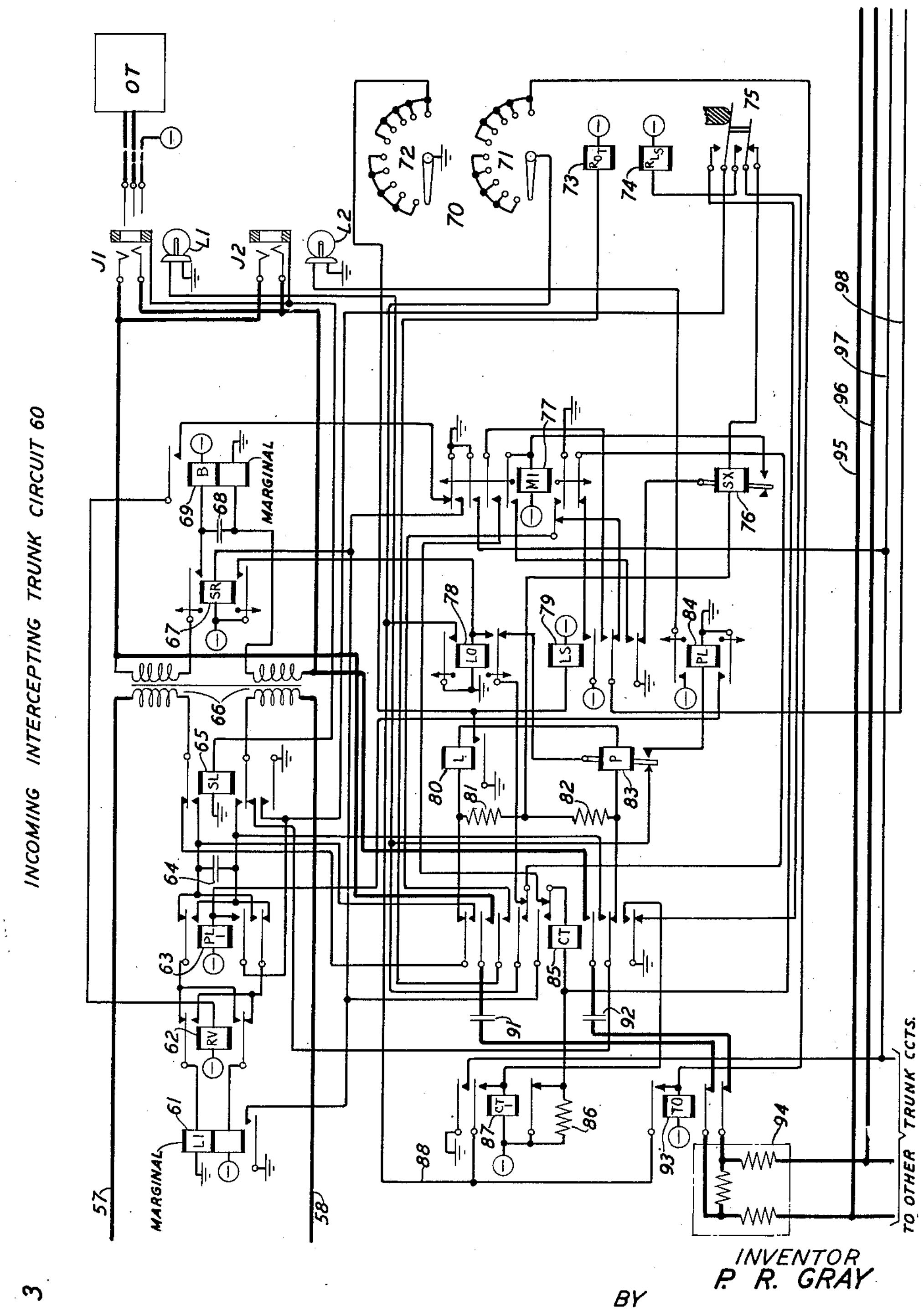
Figure 4:
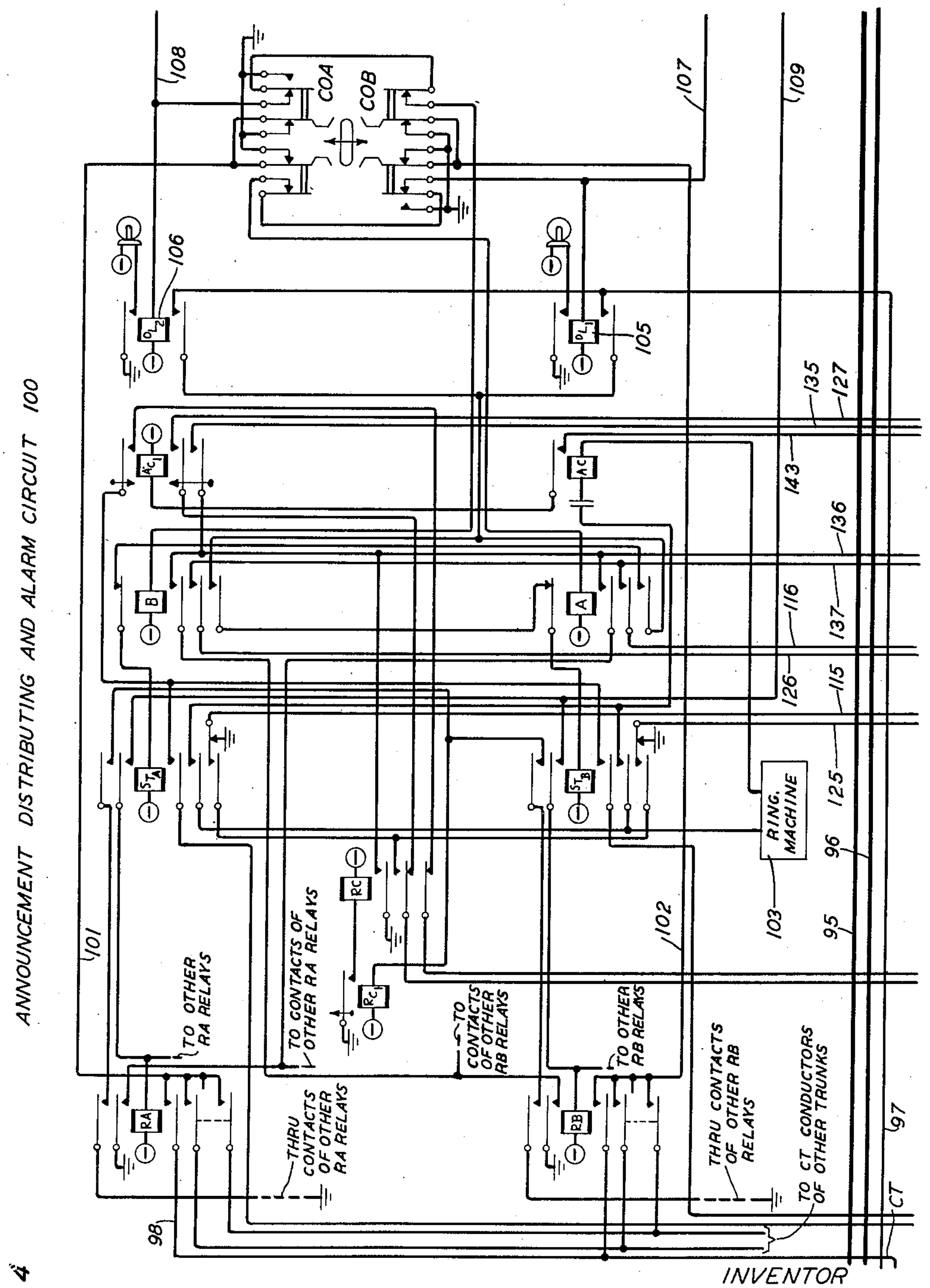
Figure 5:
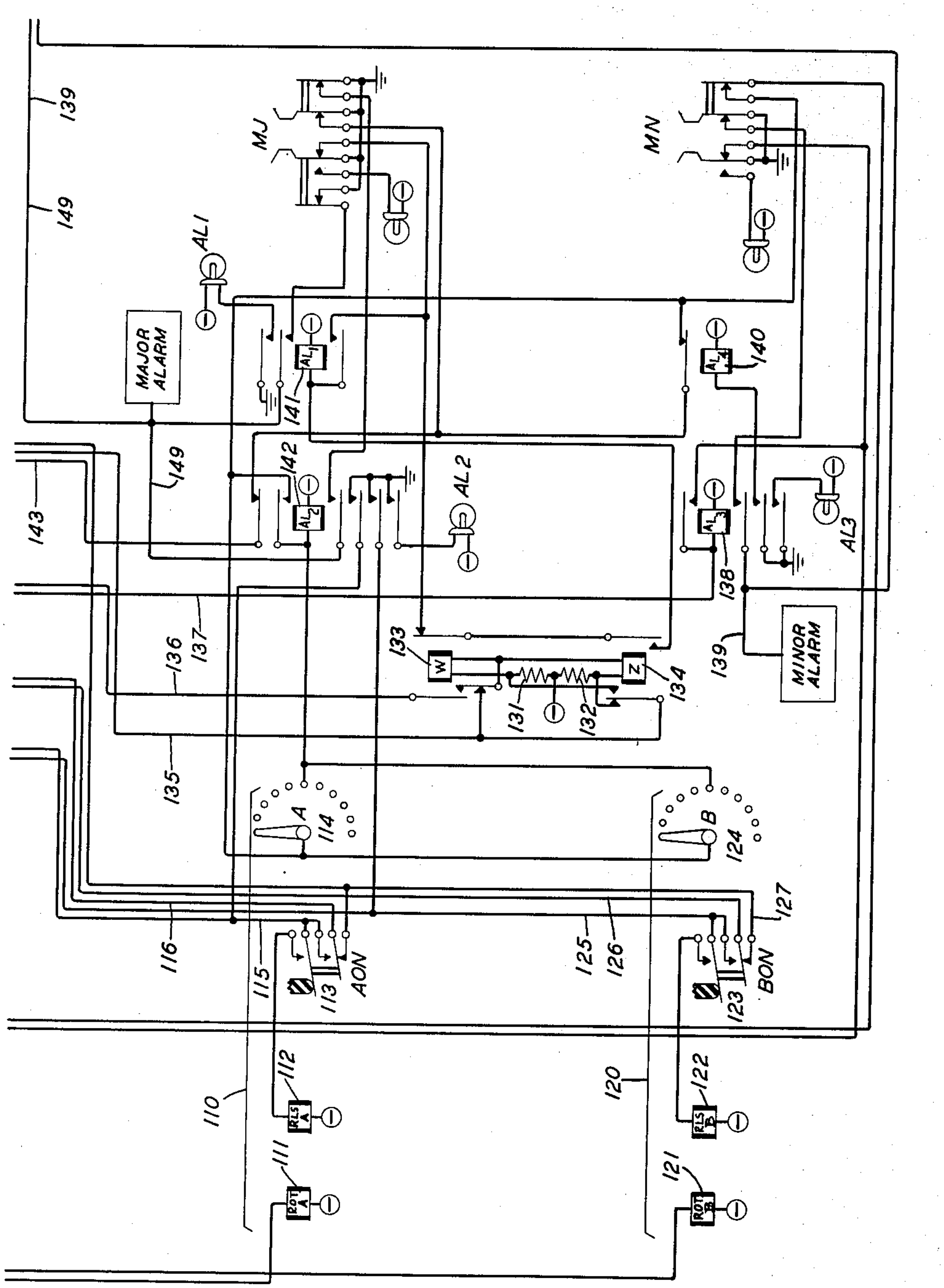
Figure 6:
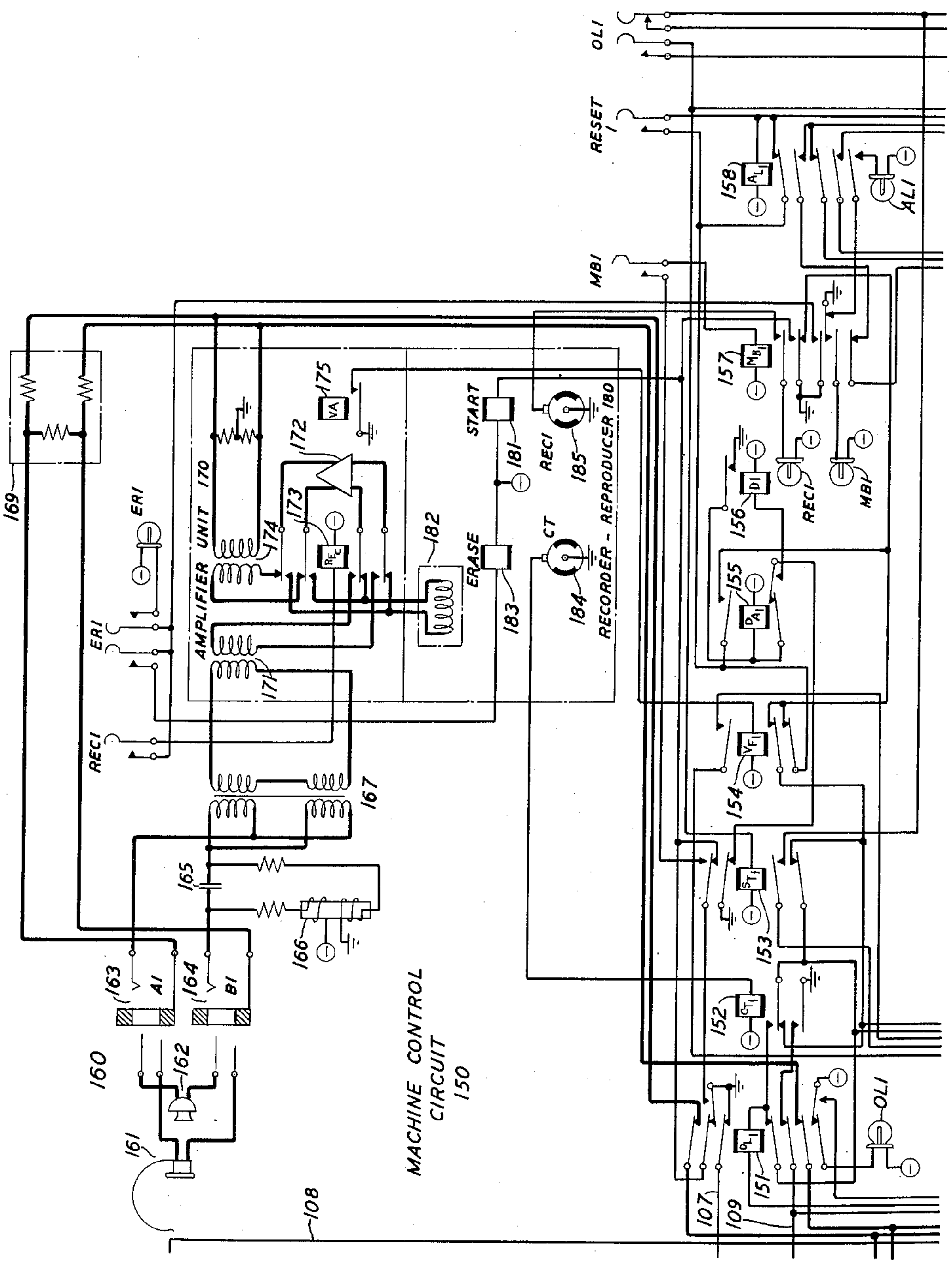
Figure 7:
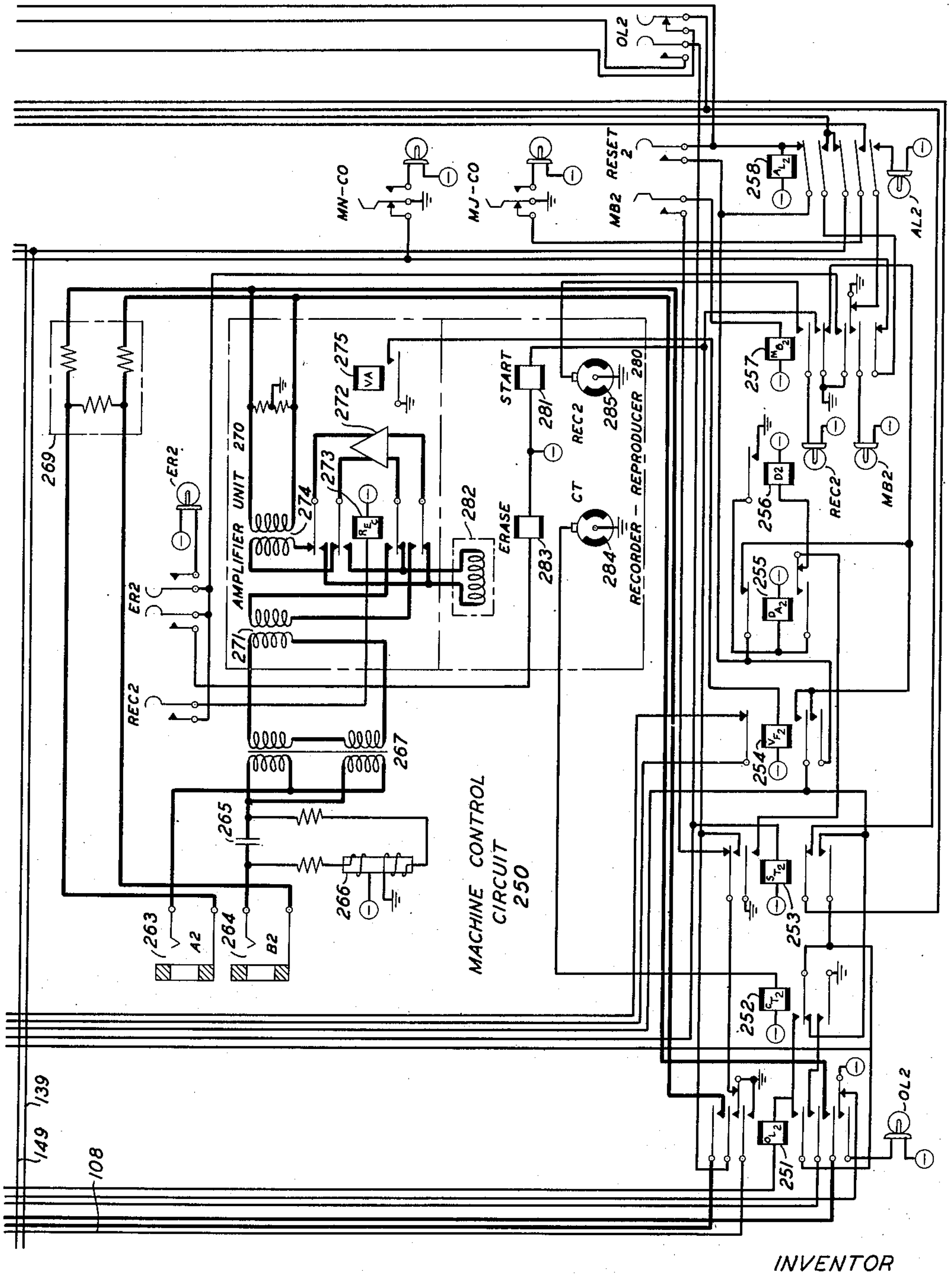

An outgoing intercepting trunk circuit 20 is individually associated with each trunk finder TF and trunk T1, and is shown in detail in Fig. 2. An incoming intercepting trunk circuit 60, individual to each trunk at the centralized intercepting equipment end, is shown in detail in Fig. 3. Jacks J1 and J2 individual to the trunk circuit 60 and cords CD1 and CD2 enable connection of operator's telephone sets to answer calls as required. Each incoming trunk circuit 60 is arranged for connection through a common distributing and alarm circuit 100, and through an announcement machine control circuit 150 to either one of two announcement machines. Figs. 4 and 5 show the distributing and alarm circuit 100 in detail; and Figs. 6 and 7 show the machine control circuit 150 in detail and show the announcement machine schematically. Fig. 6 further shows a telephone set for use in recording an announcement and for monitoring on either announcement machine.

Assume now that a call from a subscriber station 8 has been extended through a line finder LF, selector LS, connector LC and terminals 11, intercepting trunk circuit IT4, terminals 17 and trunk finder TF to outgoing trunk circuit 20. In this case the normal post springs 19 are not actuated, and the call is one to be extended to an intercepting operator through a regular intercept jack J1. Ringing current received from connector LC operates relay 42; and ground connected to the sleeve brush of connector LC effects the operation of relay 49. The ringing current circuit is traced from ringing source 525 through the lower winding of relay 506, ring (middle) brush and engaged terminal of connector LC as shown in the Butz patent, ring conductor of trunk circuit IT4, middle terminal and brush of trunk finder TF, conductor 22 of trunk circuit 20, lower back contact of relay 26, condenser 41, winding of relay 42, and lower back contact of relay 39 to ground. The ringing current source 525 is of usual character supplying alternating-current voltage during the ringing interval and a direct-current voltage for tripping during the silent interval of the ringing cycle. The circuit for operating relay 49 is traced from ground in connector circuit LC through the sleeve (lower) brush and engaged terminal, sleeve conductor of trunk circuit IT4, sleeve terminal and brush of trunk finder TF, conductor 23 of trunk circuit 20, continuity back contact of relay 26, conductor 40, inner lower back contact of relay 48, and winding of relay 49. The operation of relay 49 on a regular intercept call is without useful function. Normally the lower winding of relay 38 is bridged across incoming conductors 21 and 22; and the operation of relay 42 opens this bridge until the ringing interval ends. At the end of the ringing interval, relay 42 releases; and, during the following silent interval, the tripping battery potential connected to the winding of tripping relay 506 of connector LC effects the operation of relay 38, this operation being delayed due to the differential energization of the two windings of relay 38 while condenser 37 is being charged. The operation of relay 38 closes a circuit for operating relay 39, this circuit including the winding of relay 39, front contact of relay 38, conductor 40, back contact of relay 26, sleeve conductor 23 to ground in connector circuit LC as hereinbefore traced. Relay 39 locks through conductor 40 independent of relay 38. The operation of relay 39 opens the normally closed short circuits across thermistors 43 and 44. When the silent interval of the ringing cycle ends after operation of relay 38, relay 38 releases; and when the next ringing interval starts following the operation and release of relay 38, relay 42 is reoperated in series with thermistor 43. With relay 38 released and relay 39 locked operated, the operation of relay 42 closes a circuit for operating relay 27, which circuit includes the winding of relay 27, inner front contact of relay 42, lower front contact of relay 39, back contact of relay 38, thence through conductor 40 to ground in connector circuit LC as hereinbefore traced. Relay 27 locks through its inner upper front contact, resistor 34 and conductor 40 to the connector circuit sleeve ground as hereinbefore traced; connects ringing current source 29 through condenser 28 to the incoming ring conductor 22 to give the calling subscriber an audible ringing signal; connects diode 25 across conductors 21 and 22 to operate the tripping relay 502 of connector circuit LC thereby to disconnect the ringing source 525; and closes a circuit through conductors 57 and 58 of trunk T1 for operating relay 80 of incoming trunk circuit 60. This circuit is traced from battery through the upper winding of marginal relay 31, middle upper front contact of relay 27, a back contact of relay 32, left upper winding of repeating coil 36, conductor 57 of trunk T1, left upper winding of repeating coil 66 of trunk circuit 60, upper back contact of relay 65, an upper back contact of relay 85, windings of relays 80 and 83 in series and resistors 81 and 82 in parallel therewith, a lower back contact of relay 85, lower back contact of relay 65, left lower winding of repeating coil 66, conductor 58 of trunk T1, left lower winding of repeating coil 36 of trunk circuit 20, a back contact of relay 33, lower front contact of relay 27, and lower winding of relay 31 to ground. The current in this circuit does not operate relay 31 because relay 31 is marginal, and does not operate relay 83 because relay 83 is polarized; but relay 80 is operatively energized and closes a circuit for operating relay 79. The opertion of relay 79 closes a circuit from battery through the inner front contact of relay 79, lower back contact of relay 77, outer continuity back contact of relay 85, back contact of relay 78, back contact of relay 83 and lamp L1 for lighting this lamp which is associated with jack J1 at a regular intercepting operator's position. When an operator inserts a plug of a cord in jack J1 to answer the call, a circuit is traced from battery in the cord circuit through the sleeve conductors of the answering plug and jack J1 for operating relay 65. The operation of relay 65 disconnects the windings of relays 80 and 83 from the conductors 57 and 58 of trunk T1, causing the release of relays 80 and 79 to extinguish lamp L1; and connects conductors 57 and 58 through the left windings of repeating coil 66, front contacts of relay 65, back contacts of relay 63, back contacts of relay 62 and windings of relay 61 to ground and battery respectively; whereby the current through the windings of relay 31 of trunk circuit 20 is increased to effect the operation of marginal relay 31 as well as the operation of relay 61. The operation of relay 31 closes a circuit including sleeve conductor 23 for operating relay 26, and relay 26 locks to sleeve conductor 23 independent of relay 31. The operation of relay 61 closes a circuit for operating relay 67. The operation of relay 67 causes the operation of relay 78; and relay 67 thereupon closes a talking transmission path from the answering cord through condenser 68, and connects the windings of relay 69 to the conductors of the cord. The operation of relay 78 prevents the relighting of lamp L1 in case relay 80 is momentarily reoperated due to transients when the connection is released.

The aforementioned operation of relay 26 causes the release of relays 27 and 39 and connects conductors 21 and 22 directly to the right windings of repeating coil 36.

The release of relay 27 causes the release of relay 31, connects talking transmission condenser 30 across the left windings of repeating coil 36 and also connects the windings of relays 51 and 52 across these repeating coil windings. Thus, with relays 26, 65 and 67 operated, the talking transmission path is completed between the calling subscriber and intercepting operator. Relay 69 is under the control of a flashing key in the intercepting operator's cord and is not operated on the call presently being described. With relay 65 operated and relays 69, 63 and 62 not operated in trunk circuit 60, and with relays 32 and 27 of trunk circuit 20 not operated, relays 61 and 52 are operatively energized; but relay 51 is polarized and does not operate. Relay 52 closes a circuit for operating relay 53, and relay 53 connects holding ground potential to sleeve conductor 23 to hold the trunk finder TF until the intercepting operator disconnects from the answering jack 11. The windings of relays 54 and 55 are bridged across the right windings of repeating coil 36, relay 54 being operatively energized in series with the windings of the answering supervisory relay in the connector LC; but relay 55 is polarized and the current therethrough is in the non-operate direction. Since the lower, high resistance winding of relay 54 is included in this circuit, the current therethrough is insufficient to cause the operation of the answering supervisory relay of the connector LC. When the calling subscriber restores the telephone to release the connection, the connector LC, selector LS and line finder LF are immediately restored to normal in usual manner. When the intercepting operator disconnects from jack J1, relay 65 releases, thereby causing the release of relays 61, 67 and 78 of trunk circuit 60 in succession, and causing the release of relays 52 and 53 of trunk circuit 20 in succession. The release of relay 53 disconnects holding ground potential from sleeve conductor 23, whereby the trunk finder TF is restored to normal in usual manner.

In the case of a call from a toll board to an unassigned set of line terminals 6 in the bank of a toll connector TC, the operations of trunk circuits 20 and 60 are similar to those above described on intercept of a local call except that the battery connections in the toll connector TC are such as to cause the operation of relay 55 in trunk circuit 20 after answer of the intercepting operator so as to give the toll board operator an answering supervisory signal; and except that intermittent operation of the intercepting operator's flashing key effects the intermittent operation of relays 69 and 62 of trunk circuit 60, whereby the current through the windings of relays 51 and 52 of trunk circuit 20 is intermittently reversed to cause the alternate operation and release of polarized relay 51. The intermittent operation of relay 51, with relay 55 operated, causes the intermittent short circuiting of the high resistance, lower winding of relay 54 to cause the flashing of the toll operator's supervisory lamp in the manner described in the aforementioned Butz patent.

Assume now a trouble intercept call is extended through either a local connector LC or a toll connector TC to a set of terminals temporarily connected to a plugging-up line circuit PL and intercepting trunk circuit IT5 as shown and described in the aforementioned Butz patent. The operations of trunk circuits 20 and 60 are similar to those above described with respect to regular intercept calls with the following exceptions. Since the set of terminals to which the intercept trunk circuit IT5 is connected in the bank of trunk finder TF is in a level on which the normal post springs 19 are actuated, ground is connected to conductor 24 to operate relay 32. The operation of relay 32 prevents operation of relay 48 and interchanges the connections between the windings of relay 31 and conductors 57 and 58 of trunk T1 to cause operation of relay 83 in addition to operating relays 31 and 80. The operation of relay 32 also closes a circuit through thermistor 33 which is effective at the end of a five-second interval to operate relay 27 in case the call is abandoned before ringing current has effected the operation of relay 27, the operation of relay 27 being effective in either case to extend the call to an intercepting operator. In the case of the abandoned call, the answer and disconnect by the intercepting operator is necessary to effect the release of the trunk finder TF which may otherwise be locked in operated position because there is no sleeve connection between the plugging-up line circuit PL and trunk circuit IT5. With relays 80, 79 and 83 operated, a circuit is closed for operating relay 84. The operation of relay 84 closes a circuit for lighting lamp L2 associated with jack J2 to indicate a trouble intercept call and closes a circuit for operating relay 63. When the operator answers, the operation of relay 65 closes a locking circuit for relay 63, and with relay 63 operated the connections between the windings of relay 61 and trunk conductors 57 and 58 are interchanged; whereby, with relay 32 of trunk circuit 20 operated, the current through the windings of relays 51 and 52 is in the same direction as on a regular intercept call as hereinbefore described. When the calling subscriber or operator releases the connection, the selector and connector switches are restored to normal, but the trunk finder TF is held until the intercepting operator disconnects.

Assume now a call extended to trunk circuit 20 through terminals 12 of a local connector LC or terminals 7 of a toll connector TC, wherein ringing current effects the operation of relay 45 instead of relay 42. The operation of relay 45, after relays 49 and 39 have been operated in the manner hereinbefore described, closes a circuit for operating relay 48. Relay 48 locks to the sleeve conductor 23, connecting battery through resistors 50, front contacts of relay 49, front contacts of relay 48, back contacts of relay 27, back contacts of relay 32 and left windings of repeating coil 36 to conductors 57 and 58 to effect the operation of relay 76 in trunk circuit 60. The operation of relay 76 closes a circuit for operating relay 77, relay 77 being slow to release. The operation of relay 48 also connects tube 25 across conductors 21 and 22 to trip ringing without operating the supervisory relay of the connector and interchanges the connections between the windings of relays 54 and 55 and the right windings of repeating coil 36. The operation of relay 48 also causes the release of relay 49 thereby closing a circuit including the inner upper front contact of relay 48 for operating relay 27. The release of relay 49 also disconnects battery from conductors 57 and 58, causing the release of relay 76. The operation of relay 27 connects battery and ground through front contacts of relay 27, back contacts of relay 32 and left windings of repeating coil 36 to conductors 57 and 58 thereby causing the operation of relay 80. The operation of relay 80 causes the operation of relay 79, and relay 79 closes a locking circuit for relay 77. Relays 80 and 79 are operated soon enough to prevent the release of relay 77 after the release of relay 76. The operation of relay 77 connects ground to start conductor 97 and closes a circuit for operating relay 67. The operation of relay 67 connects the winding of relay 69 to the inner ends of the left windings of repeating coil 66 and closes a circuit for operating relay 78. As soon after the operation of relay 79 as ground is connected to cut-through control conductor 98 by operation of relays RA or RB of the distributing and alarm circuit 100 during the silent interval of the announcement machine cycle, as hereinafter described, relay 85 is operated in a circuit which is traced from conductor 98 through a front contact of relay 79, a front contact of relay 77, continuity back contact and winding of relay 85, and lower back contact of relay 87. Relay 85 locks through its continuity front contact under control of relay 77. The operation of relay 85 disconnects the windings of relays 80, 83 and 76 from conductors 57 and 58 causing the release of relays 80 and 79; and connects conductors 57 and 58 through left windings of repeating coil 66, back contacts of relay 65, front contacts of relay 85, back contacts of relay 63 and back contacts of relay 62 to the windings of relay 61, thereby operating relay 61 of trunk circuit 60 and also operating marginal relay 31 of trunk circuit 20. The operation of relay 61 closes an auxiliary locking circuit path for relay 85, and the operation of relay 31 closes the circuit for operating relay 26. Relay 26 locks to sleeve conductor 23 and causes the release of relays 27 and 39. With relay 27 released, the windings of relay 31 are disconnected from conductors 57 and 58, and the windings of relays 51 and 52 are connected across conductors 57 and 58 in series with the windings of relay 61. The operation of relay 26 bridges the windings of relays 54 and 55 across conductors 21 and 22, relay 54 being operated on both a local call and a toll call and relay 55 being operated only on a toll call. Relay 54 short circuits the high resistance windings of relays 51 and 52 to hold relay 61 operated.

The aforementioned operation of relay 85 also closes a circuit for operating relay 87, and closes a circuit for operating the rotary stepping magnet 73 of rotary switch 70. Relay 87 locks under control of relay 78, connects ground to conductor 97 in parallel with ground from a front contact of relay 77 and opens the short circuit across resistor 86. The aforementioned release of relays 80 and 79 causes the release of relay 77, and the release of relays 79 and 77 connects the rotary stepping magnet 73 to conductor 98 thereby to hold stepping magnet 73 operated to prevent advance of the brushes 71 and 72 until ground is disconnected from conductor 98 at the end of the silent interval of the announcement machine. The release of relay 77 also opens one holding ground connection for relays 67 and 85, leaving these relays operated under the sole control of relay 61; and opens the ground connection to conductor 97, leaving this conductor connected to ground only at a front contact of relay 87. With relays 67 and 85 operated, an intercepting announcement transmission path is completed which includes condenser 68, the right windings of repeating coil 66, front contacts of relay 85, condensers 91 and 92, back contacts of relay 93, transmission pad 94, conductors 95 and 96, front contacts of relay 151 or 251 of the announcement machine control circuit 150 and through amplifier output coil 174 or 274 to the recorder-reproducer head 182 or 282 of announcement machine 180 or 280. The calling subscriber or toll operator will hear the first announcement following operation of relay 85.

At the end of the silent interval of the announcement cycle during which relay 85 operated, disconnection of ground from conductor 98 causes the release of stepping magnet 73 thereby causing the advance of brushes 71 and 72 to the first off-normal position. The off-normal contacts 75 are actuated as soon as the brushes advance out of normal position. The stepping magnet 73 will be reoperated at the end of each announcement by the connection of ground to conductor 98 in the distributing and alarm circuit 100, whereby the brushes 71 and 72 are advanced one step at the end of each silent interval between successive announcements until the connection is released by the calling subscriber or operator or until a predetermined number of announcements have been made. As shown in the drawing, the terminals of banks 71 and 72 are so connected that, at the end of five announcements, brushes 71 and 72 have been advanced to position 6, in which position circuits are closed for operating relays 79 and 93. The operation of relay 79 prevents further operation of stepping magnet 73 and closes a circuit for lighting lamps L1 associated with regular intercepting jacks J1 at the regular intercepting operator's positions. This circuit for lighting lamps L1 includes the outer front continuity contact of relay 85, a back contact of relay 77 and a front contact of relay 79. Relay 93 locks operated through conductor 88 under control of relay 78 and opens the transmission path between repeating coil 66 and the announcement machine. When an intercepting operator answers the call by inserting the plug of a cord in jack J1, relay 65 operates. The operation of relay 65 connects the windings of relay 61 to the left windings of repeating coil 66, independent of relay 85, to maintain the operation of relay 61 until the connection is released by the calling subscriber or calling operator. The operation of relay 65 also closes a short circuit across the winding of relay 85 to effect the release of relay 85, this short circuit being traced from the left end of the winding of relay 85 through the upper front contact of the off-normal springs 75 of switch 70, to ground at the outer lower front contact of relay 65. The release of relay 85 extinguishes the lamps L1 and closes a circuit for operating the release magnet 74 of switch 70 to restore the brushes 71 and 72 to normal in usual manner. The off-normal springs 75 are restored to normal and relay 79 is released when the brushes reach normal position. The connection is maintained under the joint control of the calling subscriber and intercepting operator and disconnection effected as hereinbefore described on a call initially routed directly to an intercepting operator.

Usually the calling subscriber will release the connection after hearing the machine announcement and before the call is transferred from the machine to an operator; and, prior to transfer, the connection is under the sole control of the calling subscriber or calling toll operator. If the calling subscriber or calling operator disconnects prior to transfer from the machine to an intercepting operator, the local or toll connection is released in the manner described in the aforementioned Butz patent thereby opening the circuit through conductors 21 and 22, causing the release of relay 54. The release of relay 54 opens the short circuit across the upper windings of relays 51 and 52, causing the release of marginal relay 61. The release of relay 61 causes the release of relays 67 and 85. Release of relay 85 disconnects repeating coil 66 from conductors 95 and 96 leading to the announcement machine, disconnects trunk conductors 57 and 58 from the windings of relay 61, and operates the release magnet 74 to return switch 70 to normal. The release of relay 67 causes the release of relay 78; the release of relay 78 releases relay 87; and the release of relay 87 disconnects ground from start conductor 97 thus completing the restoration of trunk circuit 60 to normal. The aforementioned disconnection of the windings of relay 61 from the trunk conductors 57 and 58 causes the successive release of relays 52 and 53 of trunk circuit 20. The release of relay 53 disconnects holding ground potential from conductor 23 thus restoring the trunk finder TF to normal in usual manner.

The announcement distributing and alarm circuit 100 shown in Figs. 4 and 5 provides means for distributing the announcements and cut-through signals to the incoming intercepting trunk circuits such as trunk circuit 60 and provides means for giving alarm indications in case of failure of distributing means or failure of the on-line announcement machine to transmit cut-through signals. It also provides detail alarm lamps to aid in determining the nature of failure which may occur. There are two sets of control and distributing relays, either the one or the other of which may be in use to control the distribution of announcements from either one of the two announcement machines shown in Figs. 6 and 7. The "A" set of relays includes a control relay A, a set of cut-through signal distributing relays of which only one, relay RA is shown, a start relay STA and a rotary timing switch 110; the "B" set includes a control relay B, a set of cut-through signal distributing relays of which only one, relay RB, is shown, a start relay STB and a rotary timing switch 120. Transfer from one to the other set of relays is controlled by keys CO–A and CO–B. A relay 105 is operated if announcement machine 1 furnishing announcements and a relay 106 is operated if announcement machine 2 is furnishing announcements, individual lamps being energized to indicate which machine is in use, the circuits for operating relays 105 and 106 being hereinafter described. With both of keys CO–A and CO–B normal, relay set A will be in use if announcement machine 1 is supplying the announcements and relay set B will be in use if announcement machine 2 is supplying the announcements. With key CO–A operated, relay set "B" will be in use with whichever of machines 1 and 2 is furnishing announcements, and with key CO–B operated, relay set "A" will be in use with whichever announcement machine is in use. With the one or the other of relays 105 and 106 operated and with the one or the other of relays A and B operated, the connection of ground to start conductor 97 by any incoming intercepting trunk circuit 60 responsive to seizure on an incoming call as hereinbefore described, causes the operation of the one or the other of start relays STA and STB thereby to connect relays RA or relays RB for operation by cut-through signal pulses received through conductor 109 from whichever one of the announcement machines is in operation; and each operation of relays RA or relays RB connects ground from the contacts of key CO–A or CO–B to and through conductor 98 to all of the intercepting trunk circuits to effect the operation of the cut-through relay 85 in each of the incoming trunk circuits 60 which have been seized and which are ready to establish a connection from a calling line to the announcement machine as hereinbefore described in detail. Relays RC and RC1 are controlled by relays RA and RB and together with relays 105, 106, 133, 134, 138, 140, 141 and 142, and keys MJ and MN control the operation of major and minor alarms, both audible and visual as hereinafter described.

Each of Figs. 6 and 7 discloses a machine announcement unit of the electromagnetic type. Normally, duplicate announcements are recorded on the two machines, one machine being in the "on-line" or announcement condition and the other being in "standby" condition. The unit 150 shown in Fig. 6 is identified herein as unit 1 and the unit 250 shown in Fig. 7 is identified as unit 2. Each unit comprises an amplifier unit, a recorder-reproducer machine, control relays and keys, indicating lamps, and jacks for use in establishing a recording or a monitoring connection between the amplifier unit and an operator's telephone set. Referring to Fig. 6, the amplifier unit 170 comprises a recording coil 171, an amplifier 172, a relay 173 controlling the connections of the amplfier for recording and announcing, an announcement output coil 174, and a voice-operated relay 175; and the recorder-reproducer machine unit 180 comprises in addition to the motor means and record tape (neither of which are shown), a start relay 181, a recorder-reproducer head 182, an erasing head (not shown), an erase magnet 183 controlling movement of the erasing head, and two interrupters 184 and 185, for generating control impulses. Fig. 6 further shows an operator's telephone set 160 comprising transmitter 161 and receiver 162, telephone jacks 163 and 164, a capacitor 165 and retard coil 166 and repeating coil 167 for connecting the telephone set to the recording coil 171 of the amplifier unit, and an attenuator pad 169 for connecting the telephone set to the announcement output coil 174. The key OL1 provides for manual control of transfer of unit 1 from standby to on-line condition; key MB1 is operated to place unit 1 in maintenance condition; key ER1 controls operation of the erase magnet 184 which moves the erase head for erasing the recording on the tape before recording a new announcement from the operator; key REC1 is operated to energize relay 173 and thereby establish recording connections between the operator's transmitter 161 and recording coil 172 of the recording-reproducer unit 180; and key RESET 1 is operated followed by restoring key MB1 to normal to effect return of unit 1 from maintenance to standby condition. The lamps OL1, MB1, REC1, ER1 and AL1 indicate on-line, make-busy, recording, erasing, and alarm conditions, respectively. Unit 1 further includes control relays 151 to 158, the operation and function of which will be further described herein. Announcement unit 2, shown in Fig. 7, is similar to unit 1, the various elements being given similar reference designation except for the hundreds digit which is 2.

Assume that announcement unit 1 is in on-line condition and that unit 2 is in standby condition and that the "A" set of distributing control relays is in use in the distributing and alarm circuit 100. In this case all of the control keys of both units are normal; relays 151, 153, 154, 155, 158 and 258 are operated as shown in Figs. 6 and 7; and lamp OL1 is lighted to indicate that unit 1 is on the line. It should be noted that the control circuit 150 is shown in this condition. With machine 1 operating, start relay 181 is held operated under control of relay 151, and voice frequency relay 175 is held operated by the amplifier output, thus holding relay 154 energized. With relay 154 operated, relay 158 is held operated in a circuit including its winding and locking contact, a front contact of relay 154 to ground at a back contact of relay 157. Relay 258 is held operated through its locking contact, a back contact of relay 255 and a back contact of relay 257. Relay 153 is held operated in a circuit including the lower back contact of relay 253 and front contact of relay 158, in parallel with the winding of relay 158. Relay 155 is locked operated under the control of relay 153. The circuit for holding relay 151 operated includes the lowermost back contact of relay 251, winding and locking front contact of relay 151, a back contact of relay 254 in parallel with a front contact of relay 153, a front contact of relay 154, and a back contact of relay 157. With relay 151 operated, the announcement supply conductors 95 and 96, which are comon to all incoming intercepting trunk circuits such as trunk circuit 60, are connected through front contacts of relay 151 to the output coil 174 of amplifier unit 170; and ground is connected through a front contact of relay 151 to conductor 107 to operate relay 105 of the distributing and alarm circuit 100, thereby lighting a lamp therein to indicate that machine 1 is on the line. The ground connected to conductor 107 is further extended through back contacts of control keys CO–B and CO–A to operate relay A. With relay 105 of the distributing and alarm circuit operated, the connection of ground through a front contact of relay 77 to the start conductor 97 of any trunk circuit 60 responsive to the extension of a call thereto (as hereinbefore described) causes the operation of the start relay STA. The circuit for operating relay STA includes a back contact of relay B, front contact of relay A, a front contact of relay 105 and conductor 97. Relay 152 is operated for a short interval at the end of each announcement cycle under control of the cut-through signal interrupter 184, thereby connecting ground to conductor 109, thence through a front contact of relay STA to the windings of distributing relays RA, operating all of relays RA so as to thereby periodically connect a cut-through ground signal to the individual cut-through conductor 98 of each incoming trunk circuit 60.

The aforementioned operation of all of relays RA causes the successive operation of relays RC1 and RC once each announcement cycle, relay RC1 being slow to release. With relay STA operated, the winding of relay AC is connected to the machine ringing source 103 to start an alarm timing operation. The machine ringing source may be one having a two-second ringing interval followed by a four-second silent interval. In any case, once every ringing cycle, relay AC operates, in turn operating relay AC1. Each operation of relay AC1 closes a circuit for operating rotary stepping magnet 111 of switch 110, this circuit including a back contact of relay RC, a back contact of key MN, a back contact of relay 140, and a back contact of key MJ. Thus, stepping magnet 111 is operated once each ringing cycle after operation of relay STA, each operation of the stepping magnet advancing brush 114 one step. During normal operation, relays RA and RC are operated at the end of each announcement, and relay RC operates before brush 114 engages the terminal connected to the winding of alarm relay 142. The operation of relay RC closes a circuit for operating switch release magnet 112, this circuit including the upper front contact of off-normal springs 113 (which are actuated as soon as brush 114 moves out of normal position), conductor 115, outer lower front contact of relay STA, a front contact of relay RC, and a normally closed contact of key MN, a back contact of relay 140. Thus, once each announcement cycle, relay RC operates to restore brush 114 to normal before it reaches the terminal to which the winding of alarm relay 142 is connected, this terminal being one which will delay the operation of relay 142 for at least an interval greater than the length of the announcement cycle. If relays RA and RC fail to operate once each announcement cycle, alarm relay 142 operates through brush 114 and the back contact of relay 140, to ground at key MJ. Relay 142 locks independent of the timing switch brush, opens the circuit for operating relay AC1 to prevent further stepping of the timing switch, closes a circuit for operating release magnet 112, lights alarm lamp AL2, and connects ground to conductor 149 to cause the operation of the central office major alarm apparatus.

Should relays RA and RC be operated and any one of these relays fail to release, alarm relay 141 is operated in the following manner. Assuming both of relays 133 and 134 to be normal, the next operation of relay AC1 (under the control of ringing machine 109) closes a circuit for operating relay 133; this circuit is traced from battery through resistor 131, winding and continuity back contact of relay 133, conductor 135, outer lower front contact of relay AC1 to ground at a front contact of relay RC and/or through a front contact of relay A to ground at a front contact of one or more of relays RA. Relay 133 locks through its continuity front contact and conductor 136, independent of relay AC1. When relay AC1 releases, relay 134 operates through the locking contact of relay 133. The next operation of relay AC1 closes a short circuit through the left front contact of relay 134 across the winding of relay 133, causing the release of relay 133; and the next release of relay AC1 causes the release of relay 134. With relay 134 operated and relay 133 released, a circuit is closed for operating alarm relay 141. Relay 141 locks under control of key MJ, lights alarm lamp AL1, and connects ground to conductor 149 to energize the central office major alarm apparatus. Relay 141 will not be operated during normal operation, because the minimum interval required for operating alarm relay 141 is greater than the length of time relays RA and RC are held operated by cut-through signal pulses from the announcement machine.

Failure of the rotary switch 110 to move out of normal position or to restore to normal, as above described, effects a minor alarm. The first operation of relay AC1, after operation of start relay STA, closes the above described circuit for operating rotary stepping magnet 111; and, if the off-normal springs 113 are not immediately actuated, a circuit is also closed through the winding of alarm relay 138, conductor 137, a front contact of relay A, conductor 116, the normaly closed contacts of springs 113, conductor 127, a front contact of relay AC1, and a back contact of relay RC to ground at a contact of key MN. Relay 138 operates in this circuit, locks under sole control of key MN, lights alarm lamp AL3, connects ground to conductor 139 to operate the central office minor alarm apparatus, and closes a circuit for operating relay 140 to open the circuit for operating the stepping magnet of the rotary switch. If the off-normal contacts 113 of the rotary switch 110 are actuated but the release magnet fails to operate to restore the switch to normal, relay 138 is operated through the lower front contact of the off-normal springs 113 and held operated long enough to bring in a minor alarm as aforementioned.

When it is necessary to remove the "A" set of control and distributing relays from service for maintenance purposes, key CO–A is operated. The operation of key CO–A operates relay B, releases relay A, and disconnects ground from conductor 101 and the contacts of relays RA which cut through signal pulses to the incoming intercepting trunk circuits 60. Thereafter the "B" set of control and distributing relays is operatively associated with whichever of the announcement machines is then on line. In like manner, the operation of relay CO–B operates relay A, releases relay B, and disconnects ground from conductor 102 and the contacts of relays RB, whereby the "A" set of control and distributing relays is thereupon operatively associated with whichever of the announcement machines is then on line.

The operation of major alarm key MJ disables the major alarm control relays 141 and 142, prevents further stepping of the rotary switch then in use, and lights an alarm lamp to indicate disablement of the major alarm control relays. The operation of minor alarm key MN disables the minor alarm relays 138 and 140, prevents further stepping of the rotary switch then in use, and lights an alarm lamp to indicate disablement of the minor alarm control relays.

With machine unit 1 on line and machine unit 2 in standby condition, it may be desired to place unit 1 in standby condition and unit 2 on the line. This may be done by momentarily operating key OL2 to close a circuit for operating relay 253. This circuit includes the left contact of key OL2, right contact of key OL1, inner contact of relay 258, upper back contact of relay 255, to ground at a back contact of relay 257. The operation of relay 253 closes a circuit for operating start relay 281 of recorder-reproducer unit 280 thereby to start the operation of this unit and the energization of the associated amplifier unit 270. The operation of relay 253 disconnects ground from the left contact of key MB2 to render this key ineffective to transfer unit 2 to the maintenance condition, closes a circuit for operating relay 256, and causes the release of relay 153 of machine unit 1. The release of relay 153 closes a circuit for holding relay 253 operated after key OL2 is released, opens one of the holding circuits for relay 151 and causes the release of relay 155. As soon as amplifier unit 270 has become fully energized, the voice frequency relay 275 closes its contact to effect operation of relay 254. The warm-up time for the amplifier is normally shorter than the operate time of relay 256. The operation of relay 256 closes a circuit for operating relay 255. Relay 255 locks under control of relay 253 and opens the operating circuit of relay 256, which thereupon releases. Since relay 254 normally operates before relay 255 operates, relay 253 is held operated, and so also is start relay 253, through the outer lower front contact of relay 254 to ground at a back contact of relay 257. The operation of relay 254 opens another of the holding circuits of relay 151 thereby enabling the release of relay 151 after unit 2 is fully energized. At the end of the next succeeding announcement interval of machine 1, relay 152 operates, releasing relay 151. As soon thereafter as relay 252 is operated by a ground pulse from interrupter 284, a circuit is completed for operating relay 251, this circuit being traced from battery at the lowermost back contact of relay 151, through the winding of relay 251, inner front contact of relay 252, lower front contact of relay 253 and a front contact of relay 254, to ground at a back contact of relay 257. Relay 251 locks to the same ground independent of relay 252. With relay 151 released and relay 251 operated, the announcement supply conductors 95 and 96 are disconnected from the output of amplifier unit 170 and connected to the output of amplifier unit 270; ground is disconnected from conductor 107 and connected to conductor 108, thereby releasing relay 105 and operating relay 106 of the distributing and alarm circuit; the CT conductor 109 extending to the distributing and alarm circuit is disconnected from control by relay 152 and connected for control by relay 252; lamp OL1 is extinguished and lamp OL2 is lighted; the start relay 185 of machine 1 is released stopping the operation of machine 1; the operation of start relay 285 is maintained under the direct control of relay 251; and ground is connected through back contacts of relays 151 and 153 to the MB1 key to enable the placing of machine 1 in the maintenance condition by operation of this key.

Automatic transfer of machine 2 from standby to online condition occurs in case the voice frequency relay 175 of unit 1 releases on account of announcement failure, thereby causing the release of relay 154. The release of relay 154 causes the release of relays 151, 153 and 158. The release of relay 158 closes a circuit for lighting lamp AL1, disables the operating circuit of relay 151 making retransfer to unit 1 impossible, and with relay 258 operated connects ground to conductor 139 to operate the central office minor alarm apparatus. The release of relay 153 closes a circuit including back contacts of relays 257 and 255, locking contact of relay 258, back contact of relay 153 and winding of relay 253, thereby operating relay 253, and the release of relay 153 opens the circuit holding relay 155 to effect release of relay 155. The release of relay 151 disconnects the announcement supply conductors 95 and 96 from the output of amplifier unit 170, disconnects ground from conductor 107, disconnects the CT conductor 109 from control by relay 152, extinguishes lamp OL1, causes the release of start relay 181 of machine 1 stopping the operation of this machine, and connects ground through back contacts of relays 151 and 153 to key MB1 to allow unit 1 to be placed in the maintenance condition by operation of this key. The operation of relay 253 connects ground at the upper back contact of relay 251 to operate start relay 281 of recorder-reproducer unit 280 and thereby start the operation of announcement unit 2. The operation of relay 253 also disconnects ground from key MB2 to prevent unit 2 from being placed in the maintenance condition by inadvertent operation of key MB1, and closes a circuit for operating relay 256. When relay 252 is operated by a ground pulse from interrupter 284, relay 252 closes the operating circuit for relay 251. The operation of relay 251 connects announcement supply conductors 95 and 96 to the output of amplifier unit 270, connects ground to conductor 108 to operate relay 106 of the distributing and alarm circuit 100, connects CT conductor 109 to the outer front contact of relay 252, lights lamp OL2, supplies ground through its middle upper contact to hold the start relay 281 operated, and disconnects battery from the winding of relay 151.

The announcement unit which is in standby condition may be placed in maintenance condition by operating the make-busy key. For instance, with unit 2 in standby condition, operation of key MB2 closes a circuit for operating relay 257. The operation of relay 257 lights lamp MB2, supplies ground to the erase and record keys ER2 and REC2 rendering these keys effective when operated, connects ground to operate start relay 281 of machine 2 to start operation of this machine, lights lamp REC2 under the control of interrupter 285, causes the release of alarm relay 258 and prevents the lighting of alarm lamp AL2. The release of relay 258 disables the circuit for operating relay 253 to prevent automatic transfer of the announcement load to unit 2 while in the maintenance condition. If voice frequency relay 275 is operated, it closes a circuit for operating relay 254. Although relay 252 follows pulses from interrupter 284, relays 253, 251, 256 and 255 do not operate.

To restore an announcement unit from maintenance condition to standby condition, the reset key is operated and the make-busy key restored to normal. Thus with unit 2 in maintenance condition, key RESET 2 is operated and held operated while key MB2 is restored to normal, and then the reset key is released. The release of key MB2 causes the release of relay 257. The release of relay 257 extinguishes lamp MB2, renders keys ER2 and REC2 ineffective, causes the release of start relay 281 to stop the operation of machine 2, extinguishes lamp REC2, and closes a circuit including the contact of key RESET 2 for operating relay 258 Relay 258 locks as hereinbefore described, machine 2 now being in standby condition.

An operator may monitor on either machine by connecting a telephone set 160 to jacks 163, 164 or jacks 263, 264; and, if the machine is then in the maintenance condition, may erase the recorded announcement and make a new recording. Assuming unit 2 to have been placed in maintenance condition as above described and to have been in that condition long enough for the amplifier to be fully energized, the operation of the erase key ER2 moves the erase head, not shown, into position adjacent the tape to effect erasing of the previous recording in well-known manner, the key being held operated for a long enough time to effect complete erasure. A lamp indicates the operated condition of the erase key. After the erase key is released, the recording key REC2 is operated, operating the recording relay 273 to establish connection between transmitter 162 of the telephone set through repeating coil 267, input coil 271, amplifier 272 and the recorder-reproducer head 282, whereby the speaking of a new announcement is recorded on the tape. The recording key REC2 is thereupon released, releasing relay 273 so that the recorder-reproducer head is reconnected to the input side of amplifier 272 and the output of amplifier 272 is connected to output coil 274 and the recorded announcement is transmitted through network 269 to the operator's receiver 161. If the recording is satisfactory, unit 2 may then be transferred from maintenance to standby condition as hereinbefore described.

If the on-line machine fails and the other unit is in standby condition, said other unit is placed in operation and the associated one of alarm relays 158 and 258 releases thereby lighting lamp AL1 or AL2 and connecting ground to conductor 139 to operate the central office minor claim apparatus all as above described. In this case operation of key MN–CO will cut off the minor alarm apparatus; and the make-busy key of the defective unit may be operated to place it in maintenace condition and the MN–CO key may then be released.

If the on-line machine fails at a time the other unit is in maintenance or alarm condition, both alarm relays 158 and 258 are released and ground is connected to conductor 149 to operate the central office major alarm apparatus.

What is claimed is:

1. In a telephone system comprising subscriber lines and automatic switching means for establishing connections between calling and called lines, an intercepting operator position, an intercepting announcement machine, means including electrical motor means for continuously operating said machine, means comprising intercepting trunk circuits connected to switching means line terminals, calls to which are to be intercepted, for extending such calls to said announcement machine, said machine comprising reproducing means for periodically transmitting a recorded announcement to calling lines on calls extended to said machine, said machine further comprising contacts and means controlled by said motor means for closing said contacts following each transmission of the recorded announcement, and means including means in each said trunk circuit operated by a predetermined plurality of closures of said contacts while a call is extended through the trunk circuit to said machine for transferring the call from said machine to said operator position.

2. In a telephone system comprising subscriber lines and subscriber controlled switching means for establishing connections between calling and called lines, intercepting announcement equipment, means comprising intercepting trunk circuits connected to switching means line terminals, calls to which are to be intercepted, for extending such calls to said announcement equipment, said equipment comprising a recorder-reproducer machine arranged to periodically transmit a recorded announcement to calling lines on calls extended to said equipment, means including electrical motor means for continuously operating said machine, means comprising contacts of said machine for periodically transmitting a control signal to said trunk circuits, said contacts closed by the machine in each interval between successive transmissions of the recorded announcement, and means including relay means individual to each of said trunk circuits operated by a said control signal for completing an announcement transmitting connection from a calling line through the trunk circuit to said announcement equipment.

3. In a telephone system comprising automatic switching means for establishing connections between calling and called lines, an intercepting operator position, a continuously operating announcement machine, means comprising an intercepting trunk circuit connected to switching means line terminals, calls to which are to be intercepted, said machine comprising reproducing means for periodically transmitting a recorded announcement to the calling line on calls extended to said machine, said machine further comprising interrupter contacts closed following each transmission of the recorded announcement, a cut-through relay in said trunk circuit for clasing an announcement connection between said line terminals and said machine, announcement distributing control means comprising a start relay and cut-through control relay, first relay means in said trunk circuit operated by connection of a calling line through said switching means line terminals to said trunk circuit, a circuit for operating said start relay closed by operation of said first relay means, a circuit closed by said interrupter contacts for operating said cut-through control relay, a circuit closed by said cut-through control relay for operaitng said cut-through relay of said trunk circuit, and means in said trunk circuit including means actuated by a predetermined number of successive operations of said cut-through control relay following operation of said cut-through relay for transferring the call through said trunk circuit from said machine to said operator position.

4. In a telephone system comprising subscriber lines and automatic switching means for establishing connections between calling and called lines, said means including assigned line terminals connected to subscriber lines, disconnected line terminals and unassigned terminals, intercepting trunk circuits, connecting means operated responsive to the connection of a calling line to any disconnected line terminal or to any unassigned terminal for extending the connection to one of said intercepting trunk circuits, said connecting means including means selectively operated to identify the character of the connected terminals, an intercepting operator position, an intercepting announcement equipment, said equipment comprising a continuously operating recorder-reproducer machine arranged to periodically transmit a recorded announcement to said trunk circuits, means comprising contacts closed periodically by said machine to transmit a control signal to said trunk circuits in each interval between successive transmissions of the recorded announcement, a first means comprising relays in each said trunk circuit for extending a connection to said intercepting operator position, a second means comprising relays in each said trunk circuit operated by a control signal from said contacts for extending a connection to said announcement equipment, and means comprising said connecting means for operating said first means upon connection of a disconnected line terminal to one of said trunk circuits and for operating said second means upon connection of an unassigned terminal to one of said trunk circuits.

5. In a telephone system comprising subscriber lines and automatic switching means for establishing connections between calling and called lines, said means including assigned line terminals connected to subscriber lines, trouble intercept terminals, each of said trouble intercept terminals having been disconnected from a subscriber line on account of a trouble condition, regular intercept terminals, each of said regular intercept terminals having been disconnected from a subscriber line on account of a change of number, and unassigned terminals, intercepting trunk circuits, connecting means operated responsive to the connection of a calling line to any one of said terminals other than one connected to a subscriber line for extending the connection to one of said intercepting trunk circuits and for selectively identifying the character of the terminal through which the connection is extended, a regular intercept operator position, a trouble intercept operator position, intercepting announcement equipment comprising a recorder-reproducer machine arranged to periodically transmit a recorded announcement to said trunk circuits, means comprising contacts closed by said machine in each interval between successive transmissions of the recorded announcement to transmit a control signal to said trunk circuits, means comprising relays in each trunk circuit selectively operable under the control of said connecting means upon extension of a call therethrough to the trunk circuit to further extend the connection from one of said regular intercept terminals to the regular intercept operator position and to further extend the connection from one of said trouble intercept terminals to the trouble intercept operator position, and means including relays in each trunk circuit operated under control of said connecting means upon extension of a connection from one of said unassigned terminals to the trunk circuit and including relays operated by a control signal from said contacts for further extending the connection from the unassigned terminals to said machine.

6. In a telephone system comprising subscriber lines and automatic switching means for establishing connections between calling and called lines, said means including assigned line terminals connected to subscriber lines, trouble intercept terminals, each of said trouble intercept terminals having been disconnected from a subscriber line on account of a trouble condition, regular intercept terminals, each of said regular intercept terminals having been disconnected from a subscriber line on account of a change of number, and unassigned terminals, intercepting trunk circuits, connecting means operated responsive to the connection of a calling line to any one of said terminals other than one connected to a subscriber line for extending the connection to one of said intercepting trunk circuits and for selectively identifying the character of the terminal through which the connection is extended, a regular intercept operator position, a trouble intercept operator position, intercepting announcement equipment comprising a recorder-reproducer machine arranged to periodically transmit a recorded announcement to said trunk circuits, means comprising contacts closed by said machine in each interval between successive transmissions of the recorded announcement to transmit a control signal to said trunk circuits, means comprising relays in each trunk circuit selectively operable under the control of said connecting means upon extension of a call therethrough to the trunk circuit to further extend the connection from one of said regular intercept terminals to the regular intercept operator position and to further extend the connection from one of said trouble intercept terminals to the trouble intercept operator position, means including relays in each trunk circuit operated under control of said connecting means upon extension of a connection from one of said unassigned terminals to the trunk circuit and including relays operated by a control signal from said contacts for further extending the connection from the unassigned terminals to said machine, and means including means in each trunk circuit operated by a predetermined number of said control signals following extension of a connection from one of said unassigned terminals through the trunk circuit to said machine for transferring the connection from the machine to said regular operator position.

References Cited in the file of this patent

UNITED STATES PATENTS

| | | |
|---|---|---|
| 2,021,286 | Butz | Nov. 19, 1935 |
| 2,385,968 | Deakin | Oct. 2, 1945 |